United States Patent
Suzuki et al.

[11] 4,071,291
[45] Jan. 31, 1978

[54] HOLOGRAPHIC METHOD FOR FORMING COLOR HOLOGRAMS

[75] Inventors: Masane Suzuki; Motonori Kanaya; Takeshi Matsuoka, all of Omiya, Japan

[73] Assignee: Fuji Photo Optical Co., Ltd., Omiya, Japan

[21] Appl. No.: 624,831

[22] Filed: Oct. 22, 1975

[30] Foreign Application Priority Data

Oct. 23, 1974 Japan .................. 49-122678

[51] Int. Cl.² .......................................... G03H 1/30
[52] U.S. Cl. .......................................... 350/3.5
[58] Field of Search ............................... 350/3.5

[56] References Cited

U.S. PATENT DOCUMENTS

| 3,567,305 | 3/1971 | Collier et al. | 350/3.5 |
| 3,627,400 | 12/1971 | Caulfield | 350/3.5 |

*Primary Examiner*—Ronald J. Stern

[57] ABSTRACT

A color hologram is recorded on a holographic recording material sequentially by use of different color coherent light beams with a stripe filter placed on the recording material and moved by a length equal to the width of the transparent stripes of the filter for each different color laser beam. The color holographic image recorded is therefore composed of stripes of different color component arranged side by side in a fixed order. The color holographic image is reconstructed by exposing the hologram simultaneously to different color reference light beams through stripe filters inserted in the respective reference light beams.

3 Claims, 6 Drawing Figures

HOLOGRAPHIC METHOD FOR FORMING COLOR HOLOGRAMS

BACKGROUND OF THE INVENTION

1. Field of the Invention

This invention relates to a method for forming color holograms, and more particularly to a method for forming and reconstructing color holographic images.

2. Description of the Prior Art

It has been known in the art to form color holographic images by use of three primary color light beams superposed on a holographic recording material. Further, it has also been known in the art to form color holographic images by exposing a holographic recording material on which a color separation stripe filter is placed to a white light reference beam and a white light object beam.

In the former type of color holographic method, there is a defect in that cross-talk images appear on the reconstructed color image since different color reference light beams are projected on the hologram from the same point. When the different color reference light beams are projected onto the hologram from different positions, the reconstructed image must be viewed from only a predetermined position. If the reconstructed image is viewed from a direction different from said predetermined direction, cross-talk images are seen.

In the latter type of color holographic method in which a color stripe filter is used, light beams are diffracted by the stripe filter and accordingly the sharpness of the reconstructed image is lowered.

SUMMARY OF THE INVENTION

The primary object of the present invention is, therefore, to provide a method for forming and reconstructing a color holographic image having no cross-talk.

Another object of the present invention is to provide a method for forming and reconstructing a color holographic image having a high sharpness.

The method of forming and reconstructing a color holographic image in accordance with the present invention employs a stripe filter placed on a holographic recording material. The stripe filter is composed of transparent stripes formed between opaque stripes. The ratio of the width of the transparent stripes to that of the opaque stripes is 1:2 when three colors are used for forming and reconstructing the color holographic image. Generally, when the number of different color light beams used for forming and reconstructing the color holographic image is $n$, said ratio of the width of the transparent stripes to that of the opaque stripes is $1:n-1$. The holographic recording material is exposed to a reference light beam of one color and an object light beam of the same color, with a stripe filter placed thereon. Then, the stripe filter is moved in the direction perpendicular to the stripes by a length corresponding to the width of the transparent stripe and is exposed to a reference light beam of a second color and an object light beam of the second color. Further, the stripe filter is moved in the same direction further by the length of one transparent stripe and is exposed to a reference light beam of a third color together with an object light beam of the third color. Thus, all the different colors of the reference light beams are used to record a color holographic image on the recording material. Therefore, the color holographic image recorded on the recording material is comprised of stripes carrying information of different colors. When three colors are used, three kinds of stripes are arranged side by side with each kind of stripe receiving every third stripe.

In reconstructing the color holographic image, the same number of different color reference light beams as the same number of reference light beams used for recording the holographic image are simultaneously illuminated on the hologram.

In accordance with the present invention, different colors of information are recorded in the different positions of the recording material and are illuminated by reference lightbeams of different colors corresponding thereto, respectively. Therefore, no cross-talk is observed in the image reconstructed in accordance with the present invention. Further, since the reconstructed image can be viewed from any direction without cross-talk, the character of the three-dimensional image is sufficiently enjoyed.

DESCRIPTION OF THE PREFERRED EMBODIMENTS

Figure 1:
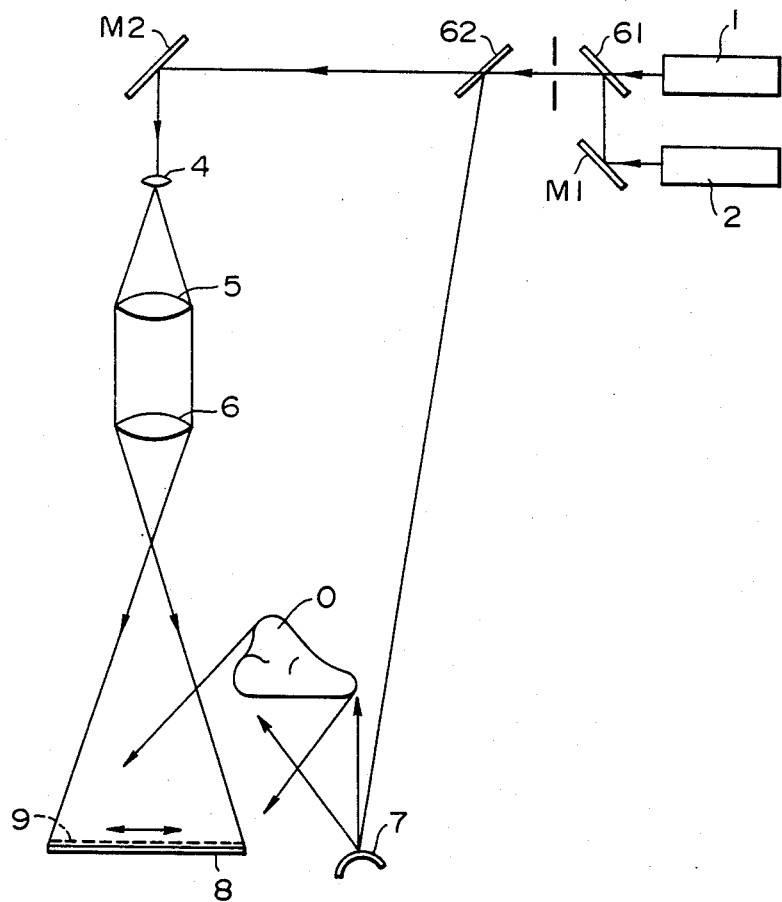
FIG. 1 is a diagram which shows an optical system for forming a color hologram in accordance with this invention.

An optical system for forming a color hologram on a holographic recording material in accordance with the method of this invention is illustrated in FIG. 1. A He-Ne gas laser source 1 and an Ar$^+$ gas laser source 2 are provided for generating a red coherent light beam and green and blue coherent light beams, respectively. The red light beam generated by the He—Ne gas laser source 1 transmits through a first semi-transparent mirror 61 and a second semi-transparent mirror 62 and is then reflected by a mirror M2. The green and blue light beams from the Ar$^+$ gas laser source 2 are reflected by a mirror M1 and is reflected by said first semi-transparent mirror 61 and then transmits in the same optical path as that of the red light beam. All light beams are split by the second semi-transparent mirror 62. A part of the light beam is reflected by the second mirror M2 and is diverged by a small beam extender 4 and is collimated by a collimater 5. The collimated light beam is then converged by a projection lens 6 and projected upon a holographic recording material 8 through a color stripe filter 9 placed thereon. The other part of the light beam reflected by the semi-transparent mirror 62 is reflected by a spheric mirror 7 and diverged thereby to be projected on an object to be recorded. The light reflected by the object including information concerning the object impinges upon the holographic recording material 8.

Figure 2:
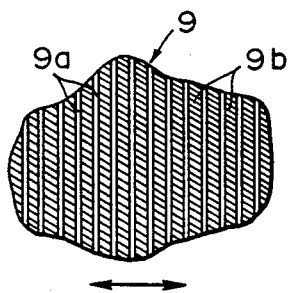
FIG. 2 is a plan view shown in enlarged scale of a stripe filter employed in the system as shown in FIG. 1.

Said filter 9 is composed of transparent stripes 9a and opaque stripes 9b as shown in FIG. 2. In other words, the stripe filter 9 has transparent stripes 9a provided parallel to each other and at equal intervals. The stripe filter 9 is made movable in the direction perpendicular to the stripes as indicated by an arrow in FIGS. 1 and 2.

The width of the opaque stripes 9b is twice as large as that of the transparent stripes 9a.

In recording a hologram on the holographic recording material 9, the He-Ne gas laser source 1 is first excited to generate a red laser beam. The red laser beam is used to record a red hologram on the recording material by the reference light beam from the projection lens 6 and the object light beam from the object 0. Since the stripe filter 9 is placed on the holographic recording material 8, the red hologram is recorded thereon in the form of stripes. Then, the stripe filter 9 is moved in one direction perpendicular to one-stripe by a length equal to the width of the stripes 9a. Then, the $Ar^+$ gas laser source 2 is excited to generate a green laser beam. The green laser beam is used to record a green hologram on the recording material in the form of stripes adjacent to the stripes of the red hologram similarly to the recording of the red hologram. Further, the stripe filter 9 is moved further in the same direction by the same length and the $Ar^+$ gas laser source 2 is excited to generate a blue laser beam. Thus, a blue hologram is recorded on the holographic recording material adjacent to the green hologram.

The hologram recorded by the above described method is composed of three kinds of stripes arranged periodically in order. Red, green and blue stripes are arranged in this order. The hologram which is recorded by the above method is reconstructed by a method as described hereinbelow and shown in FIG. 3.

Figure 3:
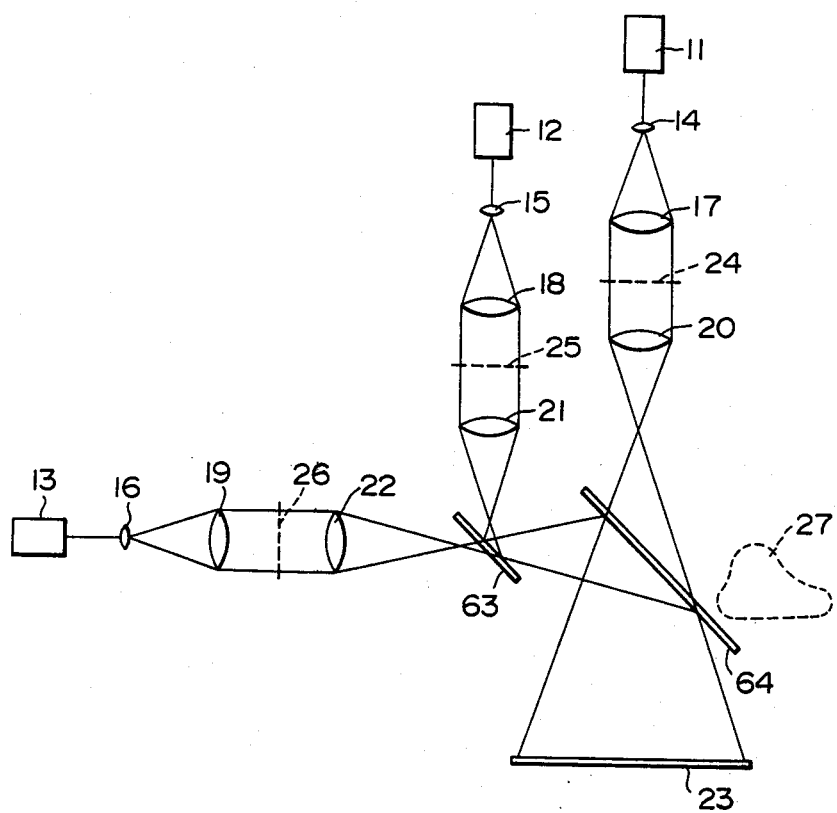
FIG. 3 is a diagram which shows an optical system for reconstructing a color holographic image in accordance with this invention.

FIG. 3 shows a preferred embodiment of an optical system for reconstructing a color holographic image recorded by the above described method. A He-Ne gas laser source 11 for generating a red laser beam, an $Ar^+$ gas laser source 12 for generating a green laser beam and an $Ar^+$ gas laser source 13 for generating a blue laser beam are provided to generate three kinds of laser beams for reconstruction of the color holographic image. Beam expanders 14, 15 and 16 are located in the optical path of the laser beams from the sources 11, 12 and 13, respectively, to expand the beams. Collimators 17, 18 and 19 and projections lenses 20, 21 and 22 are located behind the beam expanders 14, 15 and 16, respectively. The laser beam from the projection lens 20 is directly projected on a hologram 23. The laser beam from the projection lens 21 is reflected by a mirror 63 and then by a mirror 64 and is projected upon the hologram 23. The laser beam from the projection lens 22 is reflected by the mirror 64 and projected upon the hologram 23. Between the collimator 17 and the projection lens 20 is provided a stripe filter 24 which is of the same structure as that of the stripe filter 9 employed in the process of hologram image formation. Similarly, stripe filters 25 and 26 are located between the collimator 18 and the projection lens 21, and between the collimator 19 and the projection lens 22, respectively. The stripe filter 24 inserted in the optical system for projecting a red laser beam on the hologram 23 is positioned at such a position that the laser beam passing through the stripes of the filter may impinge only on the red stripes of the holographic image. Similarly, the stripe filter 25 inserted in the optical system for projecting a green laser beam on the hologram 23 is located at a position to make the laser beam passing through the transparent stripes of the filter 25 impinge only upon the green stripes of the hologram image. Further, quite similarly, the stripe filter 26 serves to make a blue laser beam impinge only upon the blue stripes of the image. When these three colors of light beams are projected on the hologram 23 simultaneously, a holographic image 27 is reconstructed and viewed from the backside of the hologram 23.

Figure 4:
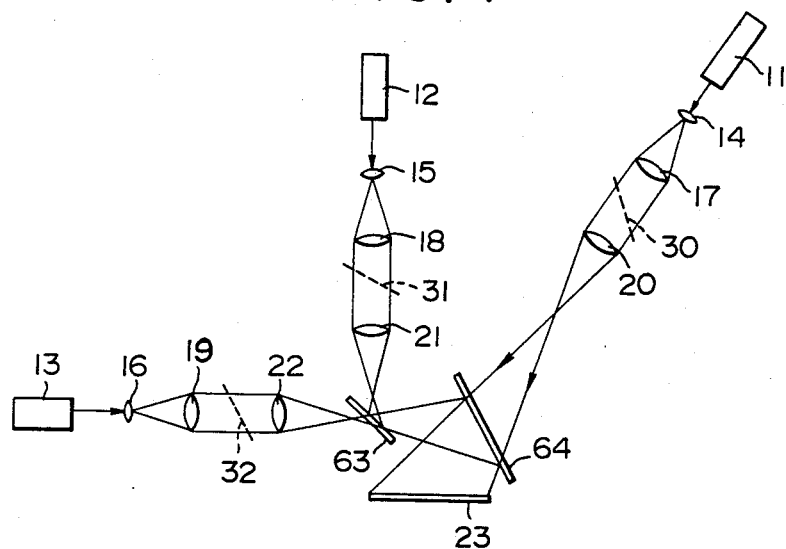
FIGS. 4 to 6 are diagrams which show various embodiments of the color hologram reconstructing system for carrying out the method in accordance with the present invention.

The above described optical arrangement for reconstructing a holographic image has a defect in that the holographic image 27 reconstructed thereby is difficult to see since the reference light beams are incident at right angle to the hologram. In order to solve this problem, the reference light beam is inclined at angle with respect to the line normal to the hologram 23 as shown in FIG. 4. In FIG. 4, various optical elements are the same as those employed in the system as shown in FIG. 3, and are indicated by the same reference numerals. In this optical system, the beam expander 14, the collimator 17 and the projection lens 20 are inclined as shown in FIG. 4.

In the above described arrangement, the reconstructed color holographic image can easily be observed since the reference light beams are obliquely incident upon the hologram. This arrangement is, however, disadvantageous in that the stripe filters 30, 31 and 32 inserted in the optical system must be obliquely oriented and the width of the stripes must be changed from one end to the other in order to form a sharp projection of the stripes on the hologram 23 and make the stripes registered with the stripe image on the hologram. Since the reference beams are obliquely incident upon the hologram 23, the stripe filters 30-32 must be obliquely oriented in the optical system so as to form a sharp projection on the hologram. Further, since the reference beams are obliquely incident upon the hologram and the stripe filters are obliquely oriented in the optical system, the width of the stripes which are close to the projection lens must be smaller than that of the stripes which are far apart from the projection lens in order to make the projected image of the stripes register with the stripes of the color hologram of one color.

Figure 5:
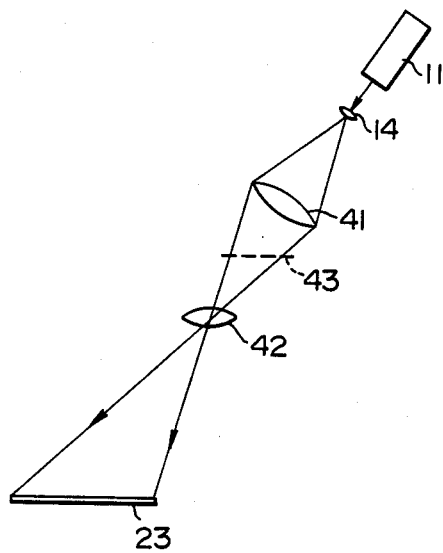

The above mentioned disadvantage of the optical system as shown in FIG. 4 is eliminated by an optical system as shown in FIG. 5. The optical system shown in FIG. 5 is a holographic image reconstructing system for reconstructing the red component of the holographic image. A laser beam from a red laser beam source 11 is expanded by a beam expander 14 and converged by a condenser lens 41 to a projection lens 42 and then projected on the hologram 23 thereby. Between the condenser lens 41 and the projection lens 42 is provided a stripe filter 43 which has transparent stripes for transmitting the laser beam therethrough. The width of the stripes of the stripe filter 43 is constant from end to end and the stripe filter 43 is oriented parallel to the hologram 23 as shown in FIG. 5. The width of the opaque stripes between the transparent stripes is also constant from end to end.

Figure 6:
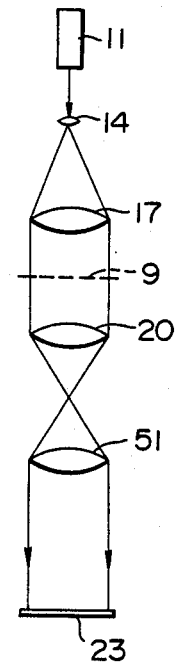

It will be understood that the width of the stripes of the stripe filters 24-26, 30-32 and 43 may not be equal to that of the stripes of the filter 9 used in the recording process. When the stripe filter 9 used in the recording process is to be used in the reconstructing system, an optical system as shown in FIG. 6 is employed. In this optical system, a collimator lens 51 is provided behind the projection lens 20 of an optical system corresponding to that employed in the arrangement shown in FIG. 3. The stripe filter 9 is located between the collimator 17 and the projection lens 20 or between the collimator lens 51 and the hologram 23.

We claim:

1. A method for forming and reconstructing a color holographic image comprising the steps of:

placing a stripe filter on the surface of a holographic recording material, said stripe filter having transparent stripes of equal width at equal intervals separated by opaque stripes, the ratio of the width of the transparent stripes to the opaque stripes therebetween being 1: (number of different color light beams used for recording the color holographic image)-1, exposing the recording material simultaneously to an object light beam of a first color and a reference light beam of the first color coherent to said object light beam through the stripe filter placed on the recording material, moving said stripe filter in one direction perpendicular to the stripes by the length equal to the width of one transparent stripe, exposing the recording material simultaneously to an object light beam of a second color and a reference light beam of the second color coherent to said object light beam through the stripe filter placed and moved on the recording material, repeating the above moving step and exposing step with different color light beams until the whole area of the recording material is occupied by the stripes of different color images, developing and fixing the color holographic image on the holographic recording material, and exposing the holographic recording material carrying the color holographic image thereon simultaneously to different color reference light beams through stripe filters inserted in the respective reference light beams, the colors of the reference light beams being the same as those of the light beams used for recording the color holographic image on the recording material, the stripe filters inserted in the reference light beams having transparent stripes for making the reference light beam of one color impinge upon the color holographic image recorded on the recording material of the same color as the one color.

2. A method for forming and reconstructing a color holographic image as defined in claim 1 wherein the reference light beams are obliquely incident upon the holographic image recorded on the recording material.

3. A method for forming and reconstructing a color holographic image as defined in claim 2 wherein the stripe filter inserted in the reference light beam is oriented parallel to the recording material carrying the holographic image.

* * * * *